(12) United States Patent
Weston et al.

(10) Patent No.: US 7,413,215 B2
(45) Date of Patent: Aug. 19, 2008

(54) METHOD AND APPARATUS FOR PROVIDING AN INFLATABLE CUSHION FOR USE WITH A VEHICLE DOOR

(75) Inventors: Douglas Stephen Weston, Tipp City, OH (US); Jeffrey Allen Welch, Washington, MI (US); Mark A. Steinbach, Clawson, MI (US)

(73) Assignee: Delphi Technologies, Inc., Troy, MI (US)

( * ) Notice: Subject to any disclaimer, the term of this patent is extended or adjusted under 35 U.S.C. 154(b) by 507 days.

(21) Appl. No.: 10/864,669

(22) Filed: Jun. 9, 2004

(65) Prior Publication Data

US 2005/0057024 A1  Mar. 17, 2005

Related U.S. Application Data

(60) Provisional application No. 60/503,564, filed on Sep. 17, 2003.

(51) Int. Cl.
*B60R 21/21* (2006.01)
*B60R 21/215* (2006.01)

(52) U.S. Cl. ............... 280/730.2; 280/728.3; 280/728.2

(58) Field of Classification Search ............. 280/730.2, 280/730.1, 728.3, 728.2; *B60R 21/20, 21/22, B60R 21/16*
See application file for complete search history.

(56) References Cited

U.S. PATENT DOCUMENTS

| 5,316,336 A | 5/1994 | Taguchi et al. | |
|---|---|---|---|
| 5,439,247 A | 8/1995 | Kolb | 280/730.2 |
| 5,447,326 A | 9/1995 | Laske et al. | 280/728.3 |
| 5,647,609 A | 7/1997 | Spencer et al. | 280/730.2 |
| 5,865,462 A | 2/1999 | Robins et al. | 280/730.2 |
| 5,913,536 A | 6/1999 | Brown | 280/730.2 |
| 5,938,233 A | 8/1999 | Specht | 280/730.2 |

(Continued)

FOREIGN PATENT DOCUMENTS

DE  41 19 788  7/1992

(Continued)

OTHER PUBLICATIONS

European Search Report dated Jun. 13, 2006.

*Primary Examiner*—Ruth Ilan
(74) *Attorney, Agent, or Firm*—Douglas D. Fekete

(57) ABSTRACT

An airbag device for use with a vehicle door having a window, the airbag device comprising: an inflatable cushion having a predetermined shape, the predetermined shape being configured to have a periphery larger than the periphery of the window of the door when the inflatable cushion is inflated; a backing plate for mounting the inflatable cushion in a desired location, the backing plate providing a reaction surface for a portion of the inflatable cushion as it is being inflated; an inflator for providing an inflation output to the inflatable cushion; and a conduit for providing fluid communication between the inflator and the inflatable cushion, the conduit having a diffuser portion disposed within the inflatable cushion, the diffuser portion having a plurality of diffuser openings for allowing the inflation output to be received within the inflatable cushion, wherein inflation of the inflatable cushion by the inflator will cause portions of the inflatable cushion to overlap the periphery of the window opening such that a retentive covering is provided over the window.

3 Claims, 8 Drawing Sheets

U.S. PATENT DOCUMENTS

| | | | |
|---|---|---|---|
| 6,086,091 A | 7/2000 | Heinz et al. | |
| 6,168,193 B1 | 1/2001 | Shirk et al. | 280/730.2 |
| 6,168,194 B1 | 1/2001 | Cuevas et al. | 280/730.2 |
| 6,276,712 B1 | 8/2001 | Welch et al. | 280/730.2 |
| 6,371,514 B1 | 4/2002 | Bombard | 280/730.2 |
| 6,481,743 B1 | 11/2002 | Tobe et al. | 280/728.2 |
| 6,508,486 B1 | 1/2003 | Welch et al. | 280/730.2 |
| 2003/0001364 A1 | 1/2003 | Welch et al. | |
| 2003/0234522 A1* | 12/2003 | Thomas | 280/730.2 |

FOREIGN PATENT DOCUMENTS

| | | | | |
|---|---|---|---|---|
| DE | 100 61 093 | | | 4/2002 |
| EP | 0 590 845 | | | 4/1994 |
| EP | 0 686 531 | | | 12/1995 |
| EP | 1 043 197 | | | 10/2000 |
| JP | 5-139232 | | | 6/1993 |
| JP | 6-1198 | A | * | 1/1994 |
| JP | 8-72658 | A | * | 3/1996 |
| JP | 9-86322 | A | * | 3/1997 |
| JP | 2000-71927 | A | * | 3/2000 |

* cited by examiner

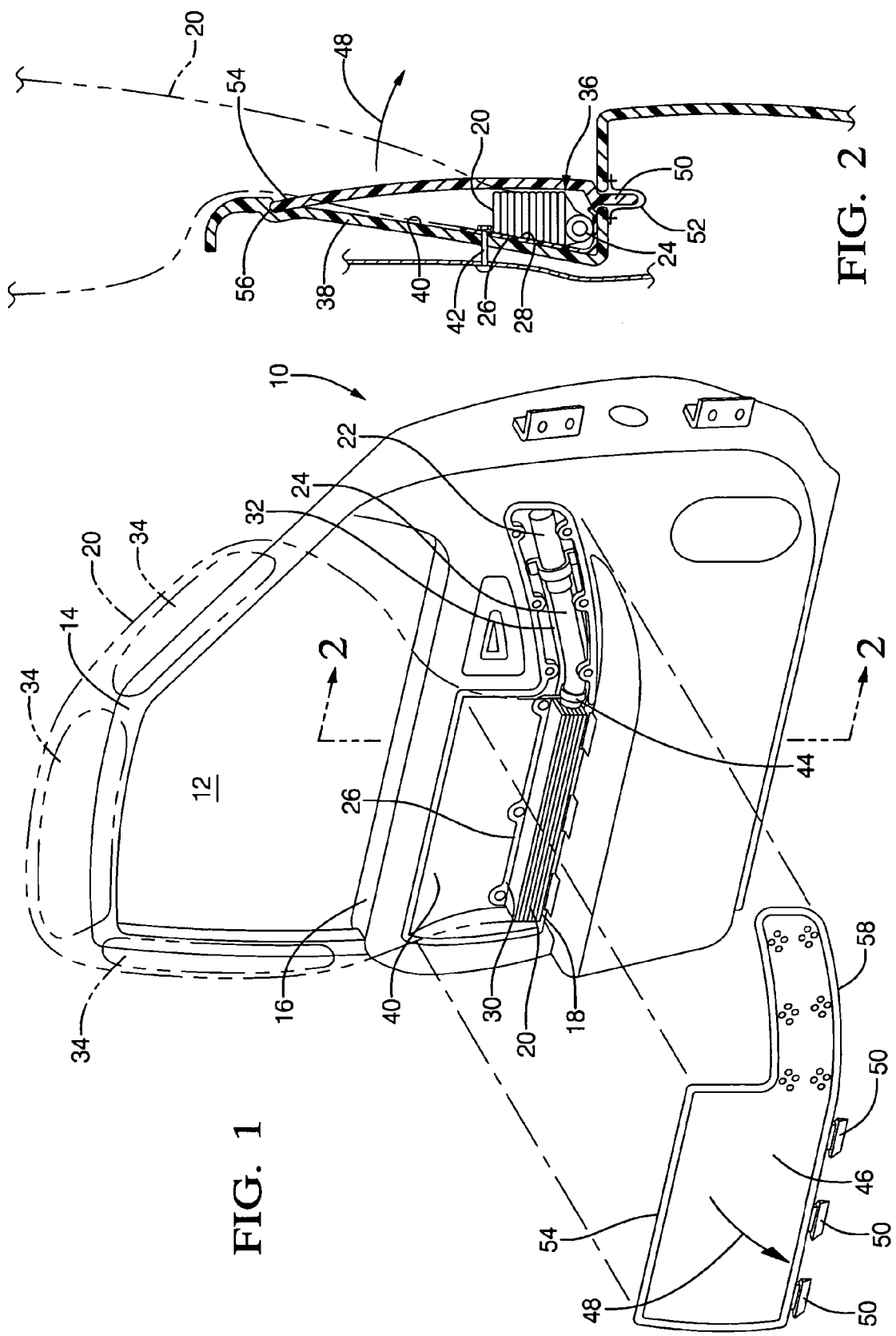

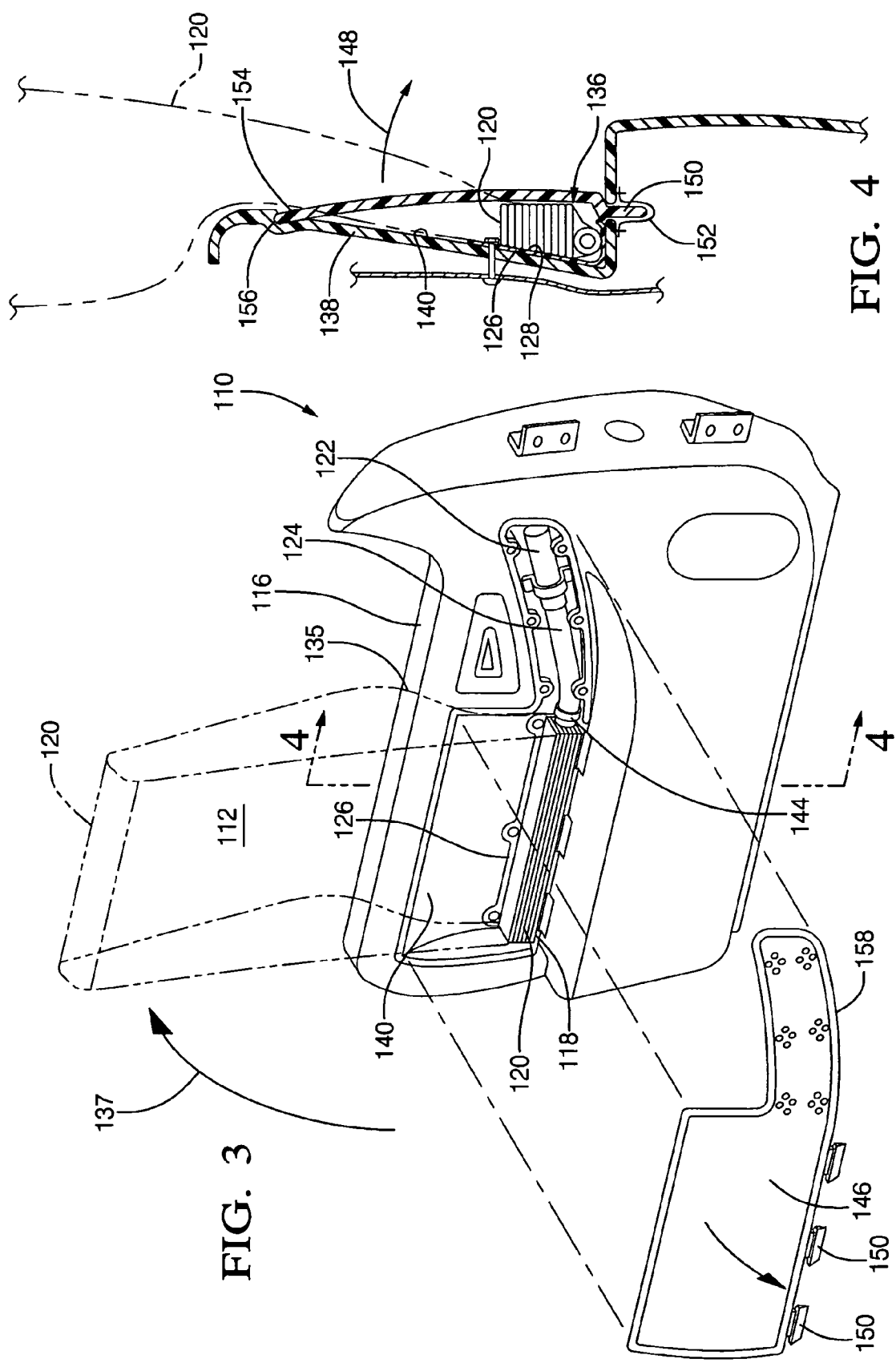

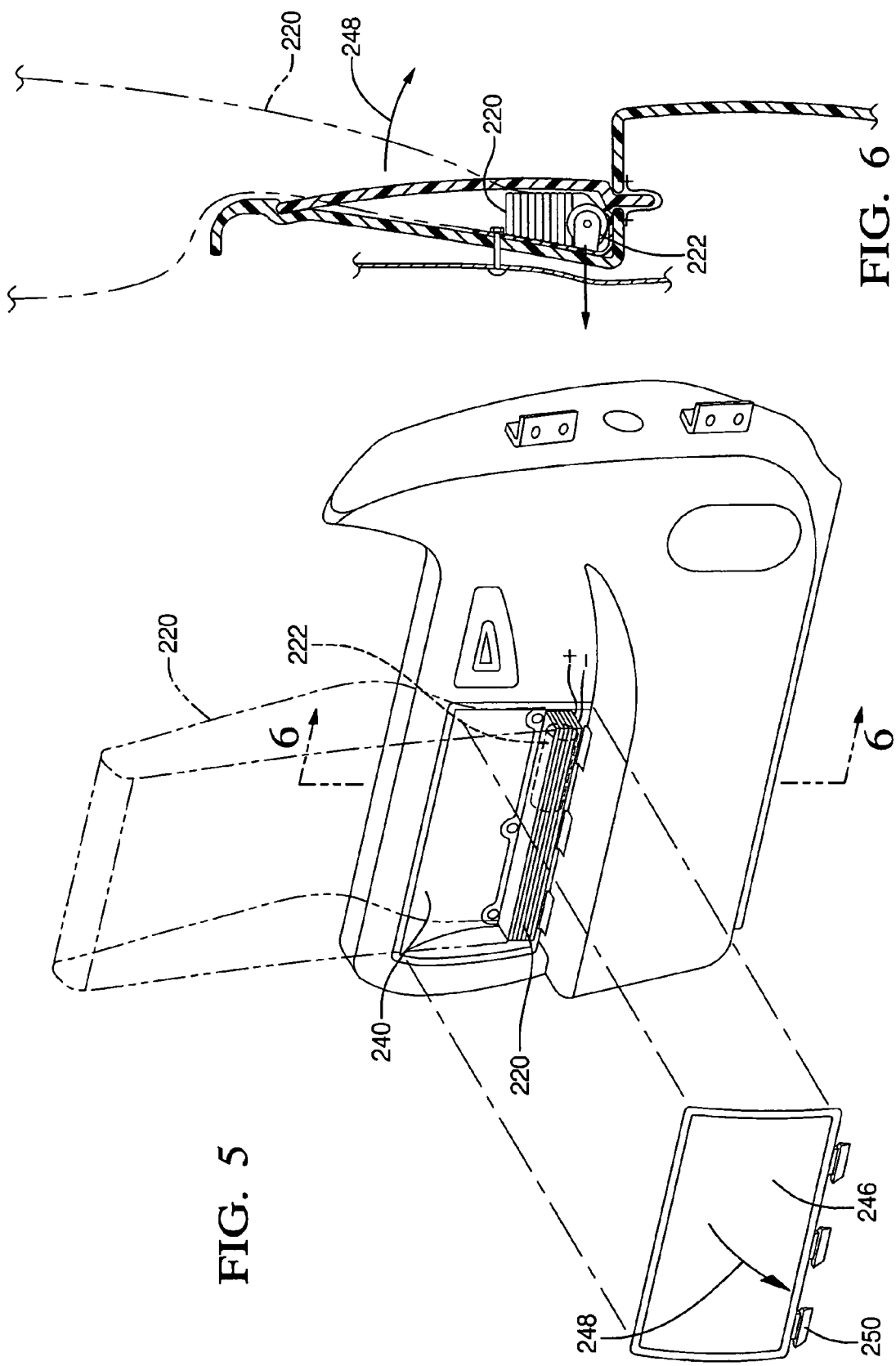

METHOD AND APPARATUS FOR PROVIDING AN INFLATABLE CUSHION FOR USE WITH A VEHICLE DOOR

CROSS REFERENCE TO RELATED APPLICATIONS

This application claims the benefit of U.S. Provisional Application Ser. No. 60/503,564 filed Sep. 17, 2003, the contents of which are incorporated herein by reference thereto.

TECHNICAL FIELD

This application relates generally to inflatable cushions for vehicles. More specifically, this application relates to a door mounted inflatable device.

BACKGROUND

Side air bags and inflatable curtains are positioned to deploy in the event of a predetermined threshold event. The air bag or inflatable cushion is inflated by an inflator, which provides an inflation output to the inflatable cushion. In an un-deployed state the cushion is stored in a folded position proximate to the area of deployment. A sensing system determines whether air bag deployment is necessary. The sensing system can be either local or remote to the inflatable cushion and typically includes an accelerometer operatively coupled with a controller to provide an activation signal to the inflator. If the sensing system determines that the predetermined threshold event has occurred the activation signal is sent to the inflator. Upon activation, the inflator provides an inflation output to inflate the cushion.

It is desirable to provide an airbag device for use proximate to a vehicle door or vehicle door opening.

SUMMARY OF THE INVENTION

An airbag device for use with a vehicle door having a window, the airbag device comprising: an inflatable cushion having a predetermined shape, the predetermined shape being configured to have a periphery larger than the periphery of the window of the door when the inflatable cushion is inflated; a backing plate for mounting the inflatable cushion in a desired location, the backing plate providing a reaction surface for a portion of the inflatable cushion as it is being inflated; an inflator for providing an inflation output to the inflatable cushion; and a conduit for providing fluid communication between the inflator and the inflatable cushion, the conduit having a diffuser portion disposed within the inflatable cushion, the diffuser portion having a plurality of diffuser openings for allowing the inflation output to be received within the inflatable cushion, wherein inflation of the inflatable cushion by the inflator will cause portions of the inflatable cushion to overlap the periphery of the window opening such that a retentive covering is provided over the window.

An airbag device for use with a vehicle door having a window, the airbag device comprising: a mounting member configured to be mounted to the vehicle door, the mounting member comprising a recessed area; an inflatable cushion having a predetermined shape, the predetermined shape being configured to have a periphery larger than the periphery of the window of the door when the inflatable cushion is inflated; a backing plate for mounting the inflatable cushion within the recessed area of the mounting member, the backing plate providing a reaction surface for a portion of the inflatable cushion as it is being inflated; an inflator for providing an inflation output to the inflatable cushion; and a conduit for providing fluid communication between the inflator and the inflatable cushion, the conduit having a diffuser portion disposed within the inflatable cushion, the diffuser portion having a plurality of diffuser openings for allowing the inflation output to be received within the inflatable cushion, wherein inflation of the inflatable cushion by the inflator will cause portions of the inflatable cushion to overlap the periphery of the window opening such that a retentive covering is provided over the window.

A method for covering a window opening in a vehicle door with an inflatable cushion, the method comprising: inflating an inflatable cushion disposed within a recess positioned within the vehicle door, the recess being configured to receive the inflatable cushion in an un-inflated state, the inflatable cushion having a predetermined shape, the predetermined shape being configured to have a periphery larger than the periphery of the window of the door when the inflatable cushion is inflated, wherein inflation of the inflatable cushion by an inflator will cause portions of the inflatable cushion to overlap the periphery of the window opening such that a retentive covering is provided over the window.

A door mounted restraint system for a door having a window, the restraint system comprising: an inflatable cushion; an inflator for providing an inflation output to inflate the inflatable cushion; a conduit providing fluid communication between the inflator and the inflatable cushion, the conduit further comprising a diffuser portion disposed within the inflatable cushion, the diffuser portion having a plurality of diffuser openings for dispersement of the inflation output into the inflatable cushion, wherein the inflatable cushion is configured have an inflated configuration that provides a retention barrier about the window.

An airbag device and assembly for use with a vehicle door, the airbag device and assembly comprising: a mounting member configured to be mounted to the vehicle door, the mounting member comprising a recessed area; an inflatable cushion; a backing plate for mounting the inflatable cushion within the recessed area of the mounting member, the backing plate providing a reaction surface for a portion of the inflatable cushion as it is being inflated; an inflator for providing an inflation force to the inflatable cushion; a conduit for providing fluid communication between the inflator and the inflatable cushion; an interior trim panel portion configured to cover the recessed area; and a door panel defined in the interior trim panel portion by a plurality of tear lines, wherein the hinge portion is disposed within the interior trim panel portion, the hinge portion allows a door panel to pivot away from the interior trim panel portion when the inflatable cushion is inflated by the inflator.

An airbag assembly for a vehicle, comprising: an interior trim panel configured to provide an interior surface; an opening disposed within the interior trim panel; an airbag module configured to be secured to the interior trim panel, the airbag module comprising a surface portion configured to match the interior surface, the surface portion being configured to cover the opening when the airbag module is secured to the interior trim portion; a carrier plate secured to the module; an inflator and an inflatable cushion secured to the carrier plate; a deployable door formed by a plurality of tear seams disposed in the surface portion, wherein inflation of the inflatable cushion causes the deployable door to pivot away from the surface portion.

An airbag module configured for mounting to an interior trim panel of a vehicle, the interior trim panel having an opening disposed therein, the airbag module comprising: a surface portion having a mounting surface and a show surface, the show surface being configured to match the interior trim panel, the surface portion being configured to cover the opening when the surface portion is secured to the interior trim panel; a carrier plate secured to the mounting surface, the carrier plate having an inflatable cushion and inflator for inflating the inflatable cushion secured thereto, the carrier plate directing the inflatable cushion towards the mounting surface when the inflatable cushion is inflated by the inflator; and a deployable door formed by a plurality of tear seams disposed in the surface portion, wherein inflation of the inflatable cushion causes the deployable door to pivot away from the surface portion.

An airbag module configured for mounting to an interior trim panel of a vehicle door, the interior trim panel having an opening disposed therein, the airbag module comprising: an interior trim panel piece configured to mount to the interior trim panel, the interior trim panel piece having a deployable door formed therein and an arm rest portion, the deployable door being configured to pivot away from the interior trim panel piece via a hinge portion, the hinge portion pivotally securing the deployable door to the arm rest portion; an inflatable cushion; and an inflator for inflating the inflatable cushion, the inflator and the inflatable cushion being positioned and secured to the interior trim panel piece such that when the inflatable cushion is inflated by the inflator the inflatable cushion causes the deployable door to pivot about an axis defined by the hinge portion.

The above-described and other features and advantages of the present invention will be appreciated and understood by those skilled in the art from the following detailed description, drawings, and appended claims.

BRIEF DESCRIPTION OF THE DRAWINGS

FIG. 1 is a perspective view of an exemplary embodiment of the present invention;

FIG. 2 is a view along lines 2-2 of FIG. 1;

FIG. 3 is a perspective view of an alternative exemplary embodiment of the present invention;

FIG. 4 is a view along lines 4-4 of FIG. 3;

FIG. 5 is a perspective view of another alternative exemplary embodiment of the present invention;

FIG. 6 is a view along lines 6-6 of FIG. 5;

FIG. 11 is a side cross sectional view of the FIG. 10 embodiment;

FIG. 13 is a side cross sectional view of the FIG. 12 embodiment.

DESCRIPTION OF EXEMPLARY EMBODIMENTS

Figure 7:
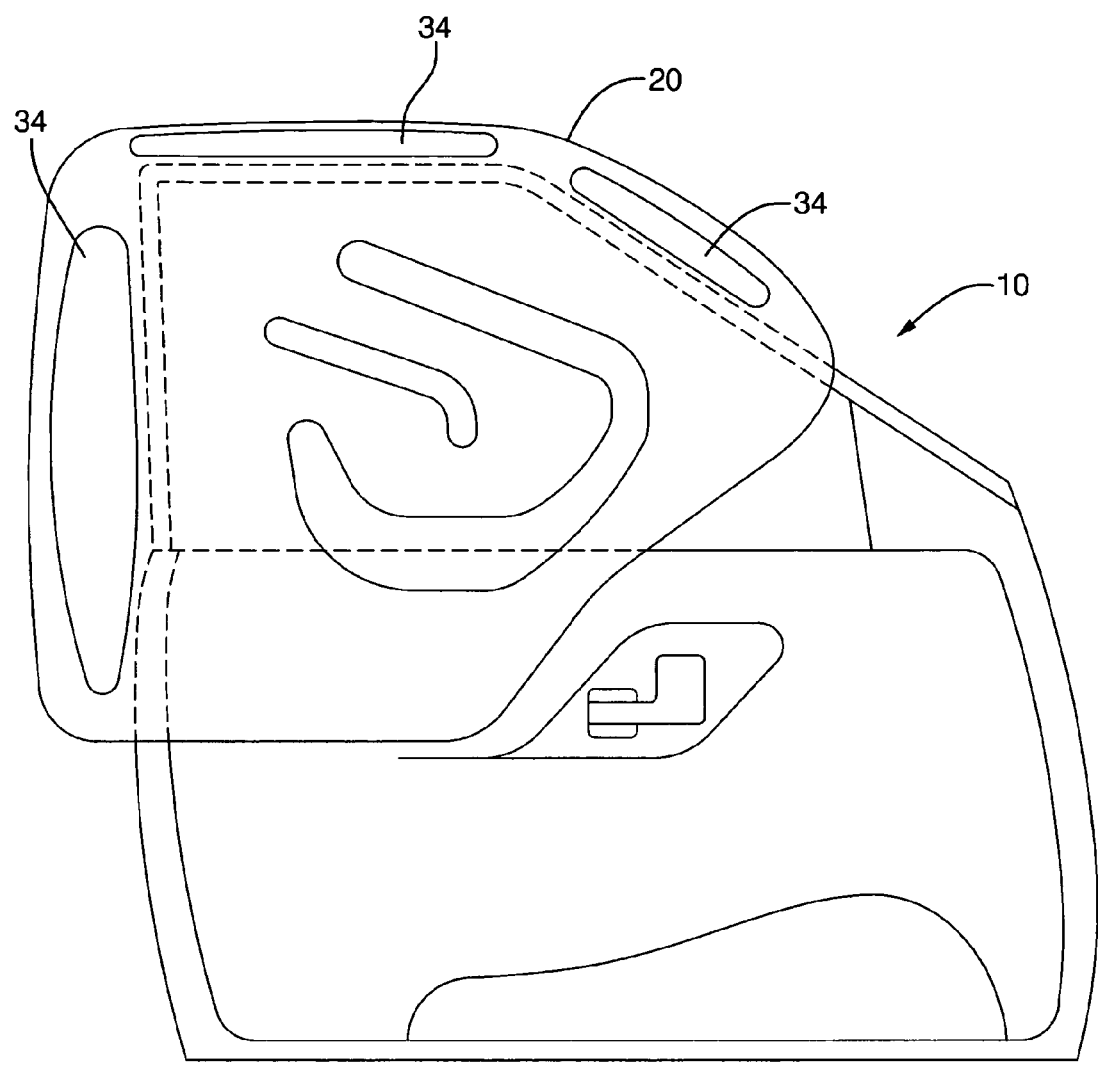
FIG. 7 is a side view of an exemplary embodiment of the present invention in a deployed state.

Disclosed herein is a method and apparatus for providing an inflatable cushion, which when deployed provides among other features a retentive barrier over a window opening of a vehicle door. The inflated configuration of the inflatable cushion is such that peripheral portions thereof extend past the periphery of the window opening and when the inflatable cushion is maintained in an inflated state these peripheral portions provide the inflatable cushion with a retentive feature.

A side mounted inflatable cushion is illustrated in U.S. Pat. No. 5,647,609, the contents of which are incorporated herein by reference thereto. A door mounted inflatable device is illustrated in U.S. Pat. No. 6,508,486, the contents of which are incorporated herein by reference thereto Referring now to FIG. 1, a vehicle door 10 is illustrated. Vehicle door 10 comprises a window opening 12 surrounded or defined by a window frame 14 and a sill portion 16 of the vehicle door 10. Disposed within a portion of the vehicle door is an airbag device or module 18. In accordance with an exemplary embodiment airbag device 18 comprises an inflatable cushion 20, which is shown in an un-inflated state and a deployed state (dashed lines). In accordance with an exemplary embodiment, cushion 20 is made of flexible fabric, such as, but not limited to nylon fabric. Cushion 20 preferably includes a silicone coating to provide the cushion with less porosity, which provides the cushion with the ability to retain its inflated condition for a longer period of time (i.e., increased up time). Non-limiting manufacturing methods of cushion 20 include sewing, dielectrically welding, weaving, and combinations thereof.

An inflator 22 provides an inflation force to inflate the inflatable cushion from the un-inflated configuration to the inflated configuration. The output end of the inflator is in fluid communication with the inflatable cushion such that when an activation signal is received by the inflator the inflator provides an inflation output for inflating the inflatable cushion. In accordance with an exemplary embodiment a diffuser tube 24 provides the fluid communication between inflator 18 and the interior of inflatable cushion 20. In one embodiment the diffuser tube has an opening secured to the inflator output end while the distal end is closed off. Tube 24 further comprises a portion that is disposed within the inflatable cushion and traverses along a bottom portion of the inflatable cushion. This portion is configured to have a plurality of diffuser openings that are arranged to face upwardly or towards the window opening. It is these diffuser openings that allow the inflation output or gases to inflate the inflatable cushion when the activation is received by the inflator.

Inflator 22 is operatively coupled with a sensing system. The sensing system is adapted to determine whether deployment of cushion 20 is necessary, and if deployment is necessary, the sensing system is adapted to provide an ignition or fire signal to inflator 22. Upon receiving the ignition signal from the sensing system the inflator provides the inflating gas to cushion from either a pressure vessel containing stored pressurized gas, a chemical reaction, a pyrotechnic combustion, or combinations thereof.

A carrier plate or backing plate 26 provides a means for mounting the airbag assembly to a portion of the vehicle door. In addition, backing plate 26 also provides a reaction surface 28 for the inflatable cushion as inflator 22 is inflating it. A non-limiting example of the material used for the carrier/beltline plate could be an injection molded plastic or stamped/trimmed sheet metal. In accordance with an exemplary embodiment, backing plate 26 comprises a cushion portion 30 and a diffuser tube portion 32. As illustrated in FIG. 1 inflator 22 is positioned remote from cushion 20.

When cushion 20 is in its inflated state (illustrated by the dashed lines) portions 34 of the periphery of the cushion extend beyond the periphery of the window opening and overlap or at least make contact with the frame portion of the window. These portions are illustrated schematically in a non-limiting manner in FIG. 1. It is, of course, understood that the overlapping portions may have other configurations than those illustrated in FIG. 1. In accordance with an exemplary embodiment, it is the configuration of these overlapping portions which provide a retentive feature to inflatable cushion 20 when it is inflated by inflator 22. Once inflated or as the cushion is being inflated, the cushion will be able to withstand a force in generally the central portion of the cushion without causing the inflatable cushion or a substantial portion thereof from passing through window opening 12. This retentive force is provided by at least the following: the rigidity of the cushion as it is being inflated, or inflated, and the overlapping portions 34 which interact with frame 14. In other words, the cushion when deployed has significant overlap with the roof rail and B-pillar to provide lateral stiffness to provide a containment means in vehicle rollovers. In an alternative exemplary embodiment and referring now to FIG. 7 the cushion will have sew-outs 21 (or woven together areas if the cushion is woven) that are not inflated, which will reduce the required inflation output while also providing retentive features. Depending on the application, the one or more sew-out areas may assist in the radial and lateral inflation of the cushion. In addition, and during inflation of cushion 20, the sew-out areas may prevent pillowing in areas not requiring inflation. It is also considered to be within the scope of the present invention for cushion 20 to have other means for biasing the cushion in desired directions. For example, tethers (not shown) can be installed inside the cushion.

Referring back now to FIGS. 1 and 2 and in accordance with an exemplary embodiment, inflator 22 is an inflation device capable of providing an initial inflation output for inflating the inflatable cushion to the inflated configuration illustrated in a predetermined amount of time, while also providing an extended level of inflation output. The extended level of inflation output is less than the original inflation output but is sufficient to maintain the cushion inflated to continue to have portions 34 interact with frame 20 to provide a retentive force. The amount of extended level of inflation output will be sufficient to overcome losses of the original inflation output due to the permeability of the inflatable cushion, vent apertures, cooling of the inflation gases etc. A non-limiting example of such an inflator will have a high molar content for providing an inflation force and then a supplemental extended inflation output. One non-limiting example of a contemplated device is a combustible gas inflator wherein an initiator ignites a combustible gas such as hydrogen which interacts with a inert non-combustible gas such as argon to provide the inflation output. Other non-limiting examples include hybrid inflators wherein a first output is provided by the initial combustion and the supplemental output is provided by a release of a secondary gas from another chamber that is opened during the initial combustion process.

The extended level of inflation output is provided for a period of time after the cushion is fully inflated. In accordance with an exemplary embodiment, the period of time for extended level of inflation output is based upon a period of time long enough to cover the length of the majority of predetermined events, which would cause an activation signal to be sent to inflator 22. In a non-limiting example, the period of time for providing the extended level of inflation is approximately 7 seconds. Of course, it is understood that the present invention is intended to provide extended levels of inflation output for periods greater or less than the aforementioned time period. These time periods may depend in part on statistical studies and the vehicle types the inflation device is configured for.

Referring now to FIGS. 1 and 2, further description of this embodiment is provided. FIG. 2 is a cross-sectional view along lines 2-2 of FIG. 1, wherein cushion 20 is shown in an un-inflated state and an inflated state (dashed lines). As illustrated, backing plate 26 provides reaction surface 28 while a cushion shape retainer 36 is provided to maintain the inflatable cushion in its folded un-inflated state. In accordance with an exemplary embodiment cushion shape retainer 36 is a fabric or shrink wrap material that works in conjunction with backing plate 26 to retain cushion 20 in the un-inflated state. As shown in FIG. 2, an exemplary configuration retains cushion 20 on at least three sides while leaving the side corresponding to the deployment direction open.

In accordance with an exemplary embodiment, the airbag device is mounted to an interior portion of door 10. In one embodiment, air bag device 18 is mounted to modular member 38 that is mounted to the vehicle door. In one embodiment member 38 is a member or item mounted within a door cavity defined by at least the outer door skin and the interior trim of the vehicle door. Member 38 is configured to provide a recess 40 for receiving air bag device 18 therein. Recess 40 is configured to receive the un-inflated cushion therein. Accordingly and during installation of the air bag device, carrier plate 26 with cushion 20 and tube portion 32 is secured to the member via mounting means 42. A non-limiting example of mounting means 42 is a bolt, rivet, screw, fastener etc. Diffuser tube 32 is also mounted to carrier plate 26 by a plurality of hose clamps 44, which can be secured to carrier plate 26 before it is secured to the mounting member or at the same time. Inflator 22 is also secured in place by a retention member which secures inflator 22 to either a portion of carrier plate 26 or mounting member 38. As illustrated in FIG. 1, inflator 22 is mounted proximate to the hinge portion of the door so that its mass is closer to the door hinges, which in turn reduces vibrations, noise, door closing efforts etc.

In accordance with an exemplary embodiment, recess 40 is covered by a deployable door 46 that is configured to pivot away from recess 40 in the direction of arrow 48 when inflatable cushion 20 is inflated. In one embodiment door 46 comprises a portion of the vehicle interior. Alternatively, door 46 is disposed behind a deployable interior panel portion.

In order to allow the deployment of door 46 in the direction of arrow 48 as well as securement of the door, a plurality of tabs 50 are received within tab openings 52 in member 38, while a portion 54 of door 46 is received within a recess 56 of member 38. Tabs 50 are configured to remain within tab openings 52 during deployment of the inflatable cushion. In accordance with an exemplary embodiment door 46 is constructed out of a bendable material such as plastic, which will allow portion 54 to be retained in recess 56 while also allowing the same to be moved out of recess 56 when the inflatable cushion is inflated. The deployment door/cover panel has portions on its panel edge held in a groove on the top and sides while the bottom edge is securely retained to the armrest structure. As the cushion inflates, the panel is bulged and releases at its top and sides. The bottom edge becomes part of a hinge, with the panel retainers or tabs 50 bending. It is possible that this hinging action could be achieved by flexing of the plastic components without bending of the retainers. In an alternative embodiment the securement of portion 54 is facilitated by a plurality of break away connectors.

Other portions of door 46 are secured over inflator 22 in a non-deployable manner (as applications may require) by a plurality of fasteners 58. It is, of course, understood that these portions may also be configured to deploy away from member 38.

In one exemplary embodiment member 38 is a door module which provides a mounting surface for other door components including but not limited to mechanical devices for opening and closing the window, guides for the window, lock mechanisms and related cabling, speakers, speaker wires, etc. as well as in some cases providing structural features of the door. In an alternative exemplary embodiment member 38 comprises the interior door panel of door 10 and recess 40 is formed therein and door 46 provides a portion of the interior trim of door 10.

Referring now to FIGS. 3 and 4 an alternative exemplary embodiment of the present invention is illustrated. Here component parts performing similar or analogous functions are labeled in multiples of 100. In this embodiment cushion 120 is intended for vehicle doors for convertibles or coupes wherein the window or window opening does not comprise an upper frame portion.

As in the previous embodiment, an airbag device or module 118 is configured to be located within a cavity 140. The airbag device 118 comprises an inflatable cushion 120, which is shown in an un-inflated state and a deployed state (dashed lines). An inflator 122 provides an inflation force to inflate the inflatable cushion from the un-inflated configuration to the inflated configuration. The output end of the inflator is in fluid communication with the inflatable cushion such that when an activation signal is received by the inflator the inflator provides an inflation output for inflating the inflatable cushion. In accordance with an exemplary embodiment a diffuser tube 124 provides the fluid communication between inflator 118 and the interior of inflatable cushion 120. Tube 124 further comprises a portion that is disposed within the inflatable cushion and traverses along a bottom portion of the inflatable cushion. This portion is configured to have a plurality of diffuser openings that are arranged to face upwardly or towards the window opening. It is these diffuser openings that allow the inflation output or gases to inflate the inflatable cushion when the activation is received by the inflator.

A carrier plate or backing plate 126 provides a means for mounting the airbag assembly to a portion of the vehicle door. In addition, backing plate 126 also provides a reaction surface 128 for the inflatable cushion as inflator 122 is inflating it. When cushion 120 is in its inflated state (illustrated by the dashed lines) a sill portion 135 is configured to define a shoulder portion which rests upon sill portion 116 of door 110. The inflated configuration of cushion 120 provides a three-dimensional triangular like shape wherein a side of the triangle (portion 135) rests upon the sill and it is this three dimensional shape and interaction that provides some of the lateral stiffness and retentive features of cushion 120. It is, of course, understood that cushion 120 may comprise shapes other than triangular shapes. Furthermore, portion 135 and the securement of the cushion to carrier plate 126 will prevent the inflated cushion 120 from pivoting outwardly through window opening 112 (e.g. in the direction of arrow 137. Reference is also made to U.S. Pat. No. 5,647,609, the contents of which are incorporated herein by reference thereto.

In addition, and due to the combination of the interaction of sill portion 135 and sill 116, as well as the securement of inflatable cushion 120 to carrier plate 126 a means for providing a retentive feature is provided. More significantly, this means for providing a retentive feature is provided without the overlapping portions illustrated in FIG. 1, as there is no frame portion in the door of FIG. 3.

It is understood, that the operations of door member 146 and its deployment away from cavity 140 are substantially similar to those of the embodiment illustrated in FIGS. 1 and 2. Once inflated or as the cushion is being inflated, the cushion will be able to withstand a force in generally the central portion of the cushion without causing the inflatable cushion or a substantial portion thereof from passing through window opening 112. This retentive force is provided by at least one the following; the rigidity of the cushion as it is being inflated or fully inflated; the shoulder portion 135, as well as the retention provided by carrier plate 126. In other words, the cushion when deployed provides a containment means.

As in the previous embodiments, inflator 122 is an inflation device capable of providing an initial inflation output for inflating the inflatable cushion to the inflated configuration illustrated in a predetermined amount of time, while also providing an extended level of inflation output. The extended level of inflation output is less than the original inflation output but is sufficient to maintain the cushion inflated to continue to have portion 135 interact with still portion 116 to provide a retentive force. The amount of extended level of inflation output will be sufficient to overcome losses of the original inflation output due to the permeability of the inflatable cushion, vent apertures, cooling of the inflation gases etc. A non-limiting example of such an inflator will have a high molar content for providing an inflation force and then a supplemental extended inflation output.

Referring now to FIGS. 3 and 4, further description of this embodiment is provided. FIG. 4 is a cross-sectional view along lines 4-4 of FIG. 3, wherein cushion 120 is shown in an un-inflated state and an inflated state (dashed lines). As illustrated, backing plate 126 provides reaction surface 128 while a cushion shape retainer 136 is provided to maintain the inflatable cushion in its folded un-inflated state. In accordance with an exemplary embodiment, the airbag device is mounted to an interior portion of door 110. In one embodiment, air bag device 118 is mounted to a modular member 138 that is mounted to the vehicle door. Member 138 is configured to provide a recess 140 for receiving air bag device 118 therein. In accordance with an exemplary embodiment, recess 140 is covered by a deployable door 146 that is configured to pivot away from recess 140 in the direction of arrow 148 when inflatable cushion 120 is inflated. In order to allow the deployment of door 146 in the direction of arrow 148 a plurality of tabs 150 are received within tab openings 152 in member 138, while a portion 154 of door 146 is received within a recess 156 of member 138. In accordance with an exemplary embodiment door 146 is constructed out of a bendable material such as plastic, which will allow portion 154 to be retained in recess 156 while also allowing the same to be moved out of recess 156 when the inflatable cushion is inflated. The deployment door/cover panel has portions on its panel edge held in a groove on the top and sides while the bottom edge is securely retained to the armrest structure. As the cushion inflates the panel is bulged and releases at its top and sides. The bottom edge becomes part of a hinge, with the panel retainers or tabs 150 bending. It is possible that this hinging action could be achieved by flexing of the plastic components without bending of the retainers.

Referring now to FIGS. 5 and 6 another alternative exemplary embodiment of the present invention is illustrated. In this embodiment cushion 220 is also intended for vehicle doors designed for use with convertibles or coupes wherein the window or window opening does not comprise an upper frame portion however, inflator 222 and diffuser tube 224, if necessary, are disposed within inflatable cushion 220. It is also understood and contemplated that in accordance with alternative embodiments the inflator in the embodiments of FIGS. 1-4 may also be disposed within the inflatable cushion.

Figure 8:
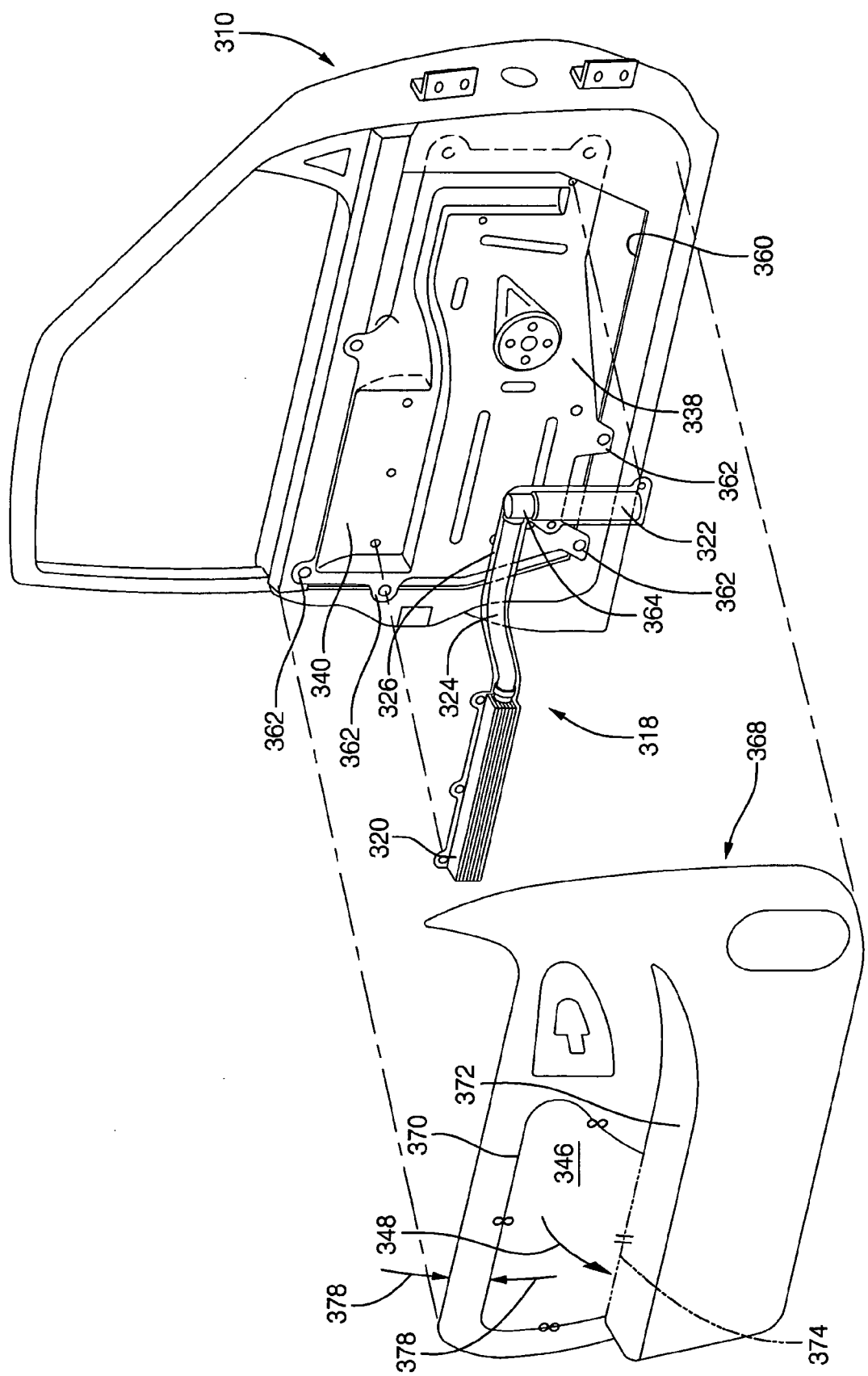
FIG. 8 is a perspective exploded view of another alternative exemplary embodiment of the present invention.
Figure 9:
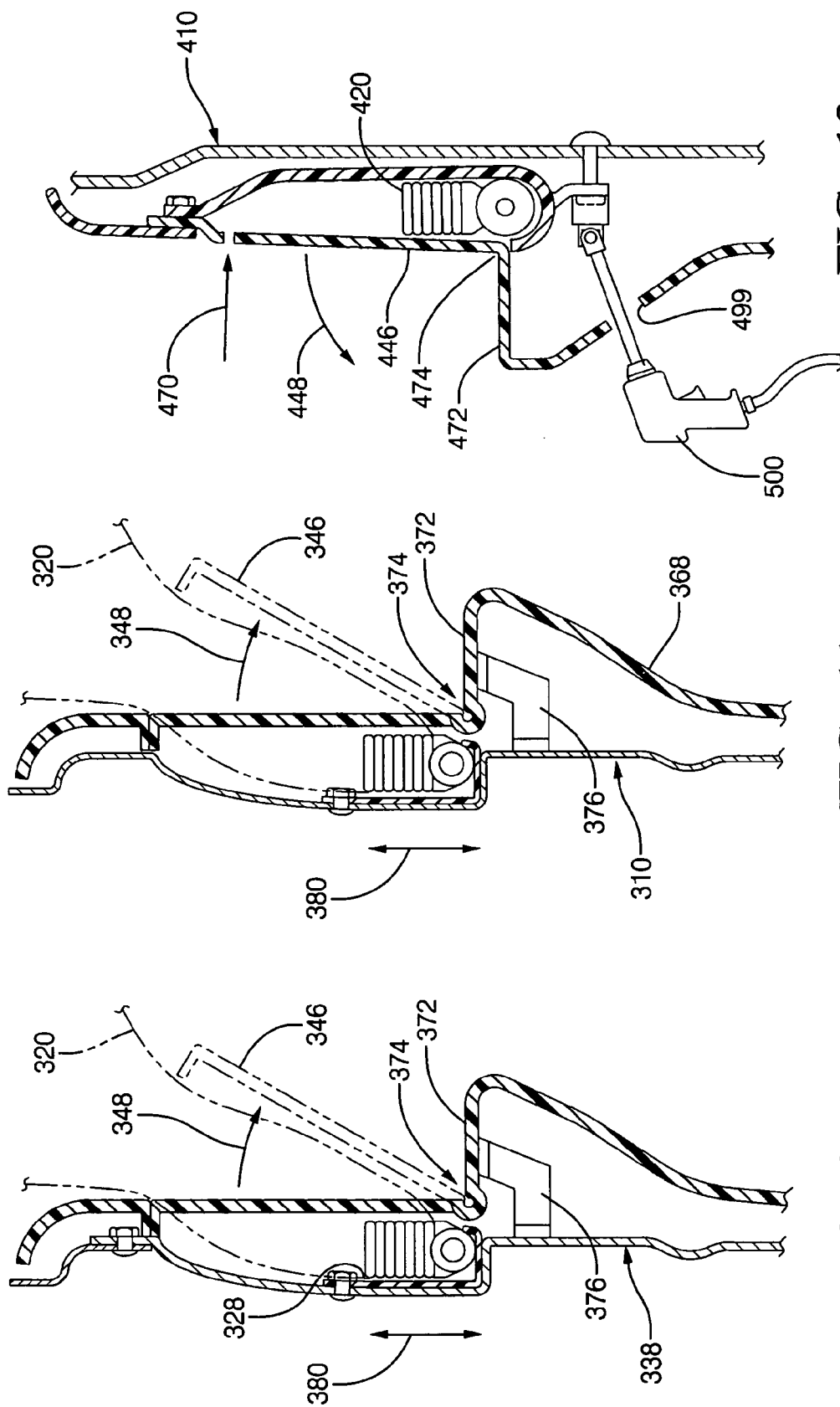
FIG. 9 is a side cross sectional view of the FIG. 8 embodiment.

Referring now to FIGS. 8 and 9 an alternative exemplary embodiment of the present invention is illustrated. Here component parts performing similar or analogous functions are labeled in multiples of 100. As in the previous embodiment, an airbag device or module 318 is configured to be located and received within a recess or cavity 340 defined in a mounting member 338. The airbag device 318 comprises an inflatable cushion 320, which is shown in an un-inflated state and a deployed state (dashed lines). An inflator 322 provides an inflation force to inflate the inflatable cushion from the un-inflated configuration to the inflated configuration. The output end of the inflator is in fluid communication with the inflatable cushion such that when an activation signal is received by the inflator the inflator provides an inflation output for inflating the inflatable cushion. In accordance with an exemplary embodiment a diffuser tube 324 provides the fluid communication between inflator 322 and the interior of inflatable cushion 320. Tube 324 further comprises a portion that is disposed within the inflatable cushion and traverses along a bottom portion of the inflatable cushion. This portion is configured to have a plurality of diffuser openings that are arranged to face upwardly or towards the window opening. It is these diffuser openings that allow the inflation output or gases to inflate the inflatable cushion when the activation is received by the inflator.

A carrier plate or backing plate 326 provides a means for mounting the airbag assembly to a portion of the mounting member. In addition, backing plate 326 also provides a reaction surface 328 for the inflatable cushion as inflator 322 is inflating it. As illustrated, mounting member 338 is configured to be secured to and/or within an opening 360 defined within a vehicle door 310. The mounting member 338 is configured to have a plurality of securement features 362 for facilitating the securement of mounting member 338 to vehicle door 310. As illustrated recess area 340 defines an area for receiving backing plate 326, which includes inflator 322, conduit 324 and inflatable cushion 320. In order to provide inflator 322 with the vertical orientation illustrated in FIG. 8, an angle fitting 364 is provided between inflator 322 and conduit 324. In addition, the vertical orientation of inflator 322 allows the same to be positioned as forward as possible towards the hinge portion of the door thereby reducing the closing effort and stresses upon the inflator. Examples of the stresses that may be inflicted upon the inflator are the result of the slamming of the vehicle door.

In addition and in alternative embodiment, carrier plate 326 may not be necessary as the recess defined by mounting member 338 will provide a suitable structural surface for mounting the inflator 322, angle fitting 364, conduit 324, and inflatable cushion 320 to the same. Once the airbag module 318 is installed within recess 340 defined by mounting member 338, an interior trim panel portion 368 is secured over mounting member 338 and/or the interior surface of vehicle door 310. As illustrated, interior trim panel portion 368 defines an interior surface of the vehicle and has deployable door 346 integrally formed therein. The deployable door 346 is defined by a plurality of tear seams 370 positioned about a majority of the periphery of deployable door 346. Here seams 370 are capable of being formed by pre-weakening the inner surface of interior trim portion 368 by any suitable means. A non-limiting example of said means for pre-weakening the inner surface would be ultra-sonically scoring the inner surface of the deployable door.

The interior trim panel portion 368 is also configured to have an armrest portion 372. Disposed in close proximity to armrest portion 372 is a hinge portion 374. As illustrated in FIGS. 8 and 9 and when the inflatable cushion is deployed, the inflating airbag applies a force in the direction of arrow 348 in order to cause deployable door 346 to pivot away from interior trim panel portion 368 wherein deployable door 346 pivots about hinge portion 374. In addition, and as also illustrated in FIG. 9, an armrest bracket 376 is positioned to provide structural support to armrest 372 of interior trim panel 368 by securing the same to mounting member 338. In addition, and as also illustrated by arrows 378 the distance from the top portion of deployable door 346 and the top sill portion of interior trim panel portion 368 and/or door 310 is within a preferred range. An exemplary distance defined by arrows 378 is greater than three inches. Of course, and as applications may require, it is understood that this preferred distance may be less than three inches. This preferred range is facilitated by vertical positioning of the airbag module within recess area 340 by adjusting its mounting positioning through movement into directions illustrated by arrows 380.

In accordance with the embodiment illustrated in FIGS. 8 and 9, the airbag module is easily inserted within a recess area of a mounting member 338 which is configured to be mounted within an opening of a vehicle door 310. In accordance with an exemplary embodiment, mounting member 338 is manufactured out of structural materials such as steel or injection molded plastic with structural reinforcement. The mounting member 338 may also be configured to house a plurality of the items found within the vehicle door for example, speakers, electrical wiring, latching mechanisms, motors, cables etc., which may be used for facilitating the movement of the window of the vehicle door. In addition, interior trim panel portion 368 is capable of being formed during a separate manufacturing process wherein all of the interior features are molded into interior trim panel portion 368 as well the tear seam and hinge for deployable door 346. Accordingly, assembly and separate manufacturability of the airbag assembly illustrated in FIGS. 8 and 9 is easily and more efficiently achieved. For example, mounting member 338 is capable of being manufactured separately from airbag module 318 as well as interior trim panel portion 368. However, each of these items are easily installed during an assembly process whereby vehicle door 310 is put together.

Figure 10:
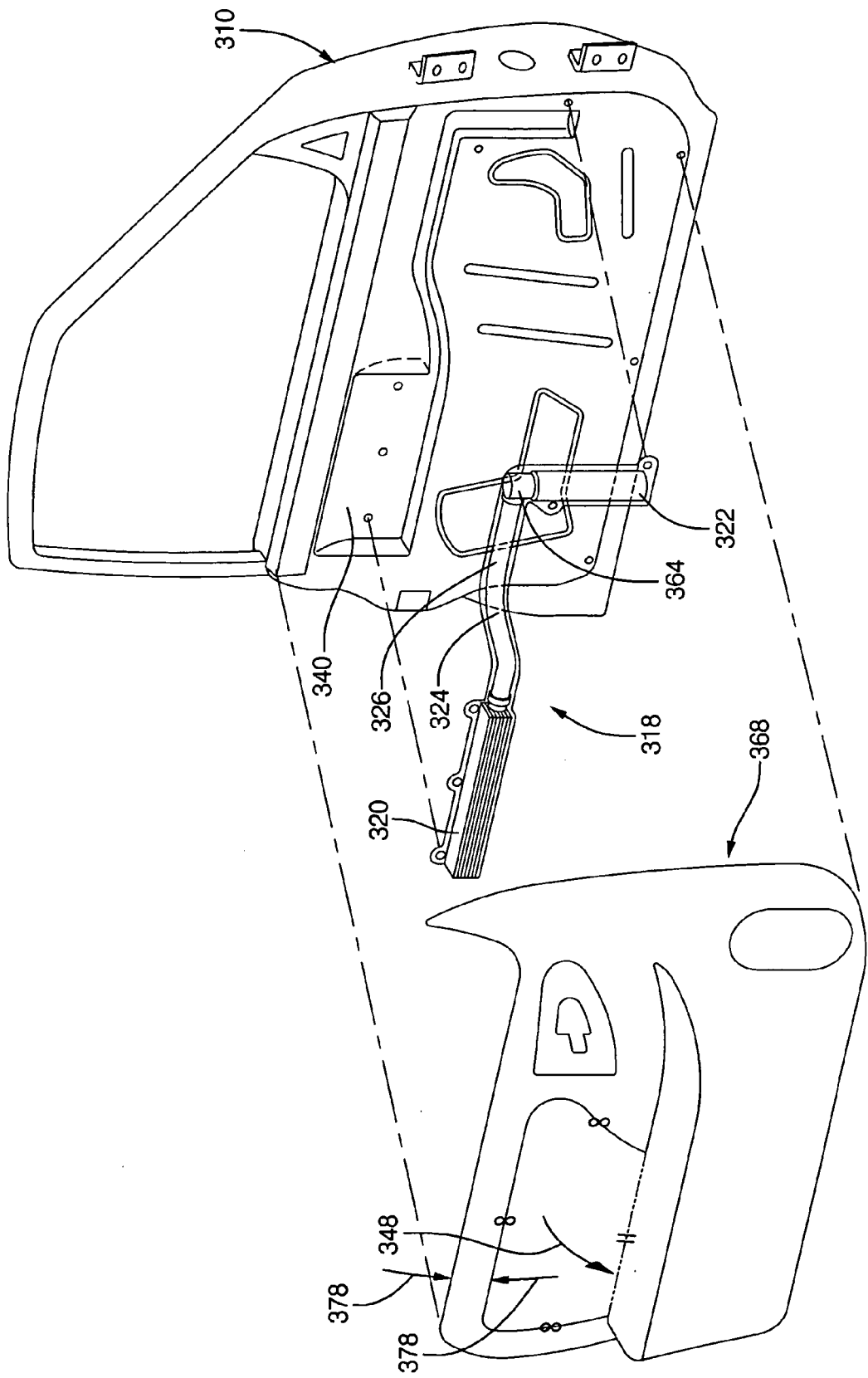
FIG. 10 is a perspective exploded view of yet another alternative exemplary embodiment of the present invention.

Referring now to FIGS. 10 and 11 yet another alternative exemplary embodiment of the present invention is illustrated. Here the features of mounting member 338 are directly integrated into the interior sheet metal of the vehicle door. Thus, instead of a separate installation of mounting member 338 to the vehicle door the airbag module is installed into the recess of the vehicle door and then the interior trim panel with the integral deployment door formed therein is installed directly over the inflatable cushion.

Figure 12:
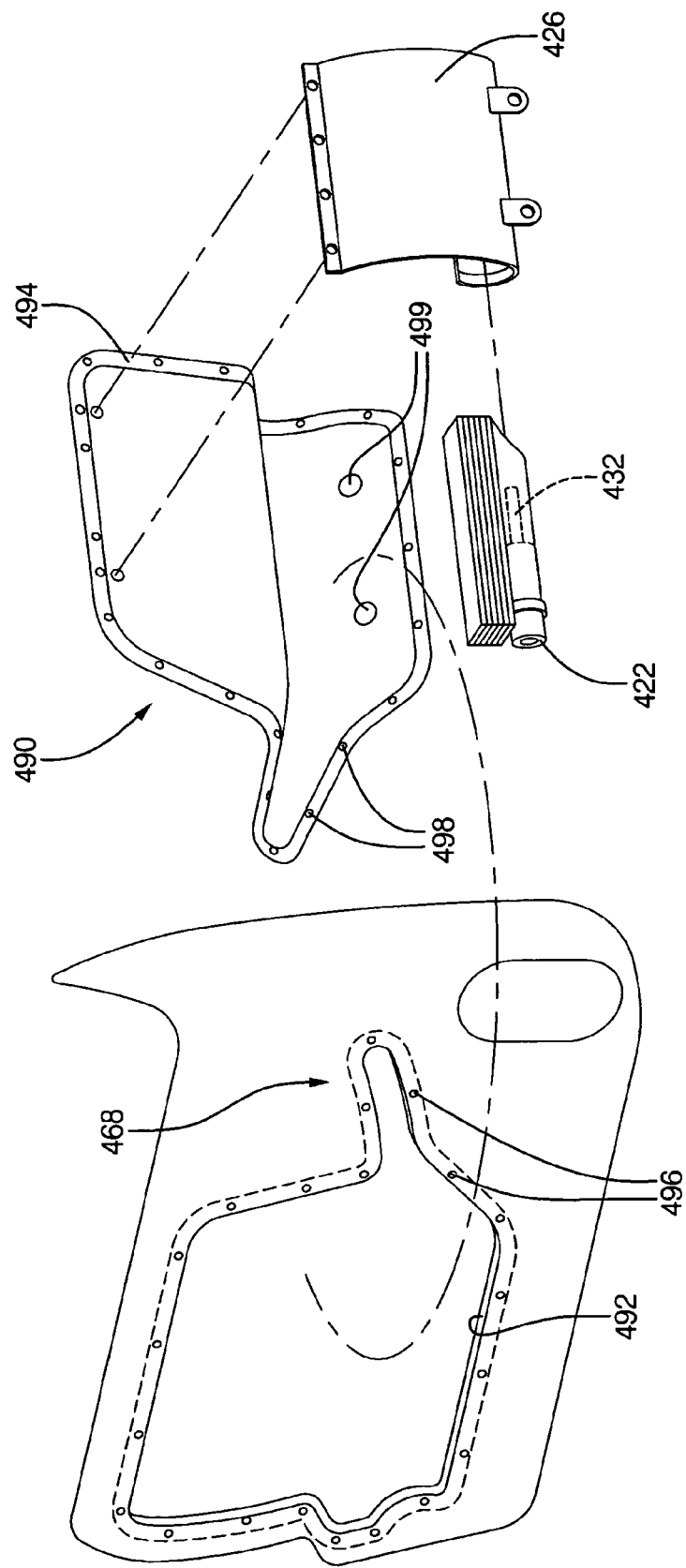
FIG. 12 is a perspective exploded view of still another alternative exemplary embodiment of the present invention.

In yet another alternative exemplary embodiment and referring now to FIGS. 12 and 13, a separate door module 490 is provided. Here module 490 is configured to cover and/or be secured to an opening 492 provided in an interior trim panel portion 468. In this embodiment, the module is a self-contained item that also provides a portion of the interior surface of the vehicle door or alternatively a portion of the interior surface of the vehicle that does not comprise the door panel. In the latter embodiment, the module is particularly useful in larger vehicles wherein side impact airbag modules are disposed in other locations besides the vehicle door. Non-limiting examples are rear quarter panels, non-sliding door panel in vans etc. This is particularly useful in vehicles wherein seats are re-locatable (e.g., vans and mini-vans) and the feature of a seat mounted airbag module is replaced by a corresponding trim mounted airbag module. As used herein door is intended to include but not be limited to pivoting doors, sliding doors (e.g., vans and mini-vans) and lift gates.

In other words an inner trim unit with an integrally attached airbag module is provided. Accordingly, module 490 is capable of being manufactured in a manner that allows the same to be secured over an opening in the interior trim panel portion. Although a particular configuration is illustrated it is contemplated that opening 492 and module 490 may each be configured to provide the module for use with various vehicle interior applications (e.g., door or other interior trim area).

For example, the forward vehicle portion of the exterior surface of module 490 is capable of being configured to match interior trim styling and/or the location of the mechanical components such as switches for locks, window regulators and door latches etc. As illustrated, module 490 will comprise a surface portion 494 that is not only configured to match the interior of trim panel 468 but the surface portion will also include the deployable door 446, the arm rest portion 472 and the carrier plate 426 with the inflator 422 and the inflatable cushion 420 secured thereto. In this embodiment, at least a portion of the inflator and the diffuser is disposed within the inflatable cushion in order to limit the overall length of the module. Of course, and as applications may require the inflator may be disposed away from the inflatable cushion wherein a conduit provides the fluid communication between the inflatable cushion and the inflator which provides an inflation force for inflating the inflatable cushion.

Accordingly, the module is easily installed over the trim panel piece by aligning the surface portion with the interior trim panel piece. In order to secure the module to the interior trim panel of the door a plurality of securement features 496 are disposed about the periphery of the opening for engagement with a complimentary set of tabs or securement members 498 disposed on the back side or mounting side of the door module. As illustrated, at least a pair of securement openings 499 are disposed in surface portion 494 such that a tool 500 may be inserted therein in order to secure carrier plate 426 to a portion of the vehicle door once the module has been placed over and secured about opening 492 and the trim panel has been mounted to the door. A non-limiting example of such a tool would be a drill having a socket extension for securing a plurality of bolts through carrier plate 426 into threaded openings in the vehicle door. Of course, other means for securement of the carrier plate to the vehicle door are contemplated to be within the scope of the present invention. After this installation step has been performed openings 499 are covered by plugs or other equivalent items that will provide an aesthetically pleasing appearance thus this step also allows direct securement of carrier plate 426 to the vehicle door after the module is secured to the interior trim panel and the trim panel has been mounted to the door.

Accordingly, this embodiment allows a separate module to be manufactured, sold and distributed to an assembly line wherein the module is secured to the vehicle door during the assembly of the vehicle. The module has an enlarged surface portion that will match the interior trim panel portion and will have an integrally formed deployment door that allows the inflatable cushion to be deployed from a cavity located within the vehicle door. Thus, a single module unit containing the inflatable cushion is capable of being separately installed into an opening located within the interior trim panel portion of the vehicle door. An advantage of such a configuration allows airbag modules to be tested, designed and separately manufactured for use with a plurality of vehicles having variations in the configuration and/or textured surface of the interior trim panel portion. In other words, a variety of interior trim panel portions may be configured for use in many different applications wherein each of the interior trim panel portions has an opening, which may be configured for the particular application of the interior trim panel with openings sized and configured for particular applications (e.g., the type of vehicle, the type of vehicle door, the type of vehicle trim design, the location of the arm rest) and the surface portion of the airbag module is configured to accommodate the same. Moreover, such design changes may be made at the location wherein the module is being manufactured.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

The invention claimed is:

1. A door mounted inflatable device, comprising:
  a modular member adapted to be mounted to a vehicle door, said modular member defining a recess and a plurality of tab openings,
  an inflatable cushion disposed within the recess;
  an inflator for providing an inflation output to inflate said inflatable cushion;
  a conduit providing fluid communication between said inflator and said inflatable cushion, said conduit further comprising a diffuser portion disposed within said inflatable cushion, said diffuser portion having a plurality of diffuser openings for dispersement of said inflation output into said inflatable cushion, wherein said inflatable cushion is configured to have an inflated configuration that provides a retention barrier proximate to a surface of the door;
  a carrier plate disposed with the recess and configured to provide a reaction surface for the inflatable cushion; and
  a deployable door having tabs received in the tab openings and covering the recess.

2. The door mounted inflatable device as in claim 1, wherein said inflator is mounted on said carrier plate proximate to a hinge side of the vehicle door.

3. The door mounted inflatable device as in claim 1, wherein said carrier plate comprises an elongated portion, wherein a portion of said conduit is secured to said elongated portion.

* * * * *